Figure 1:
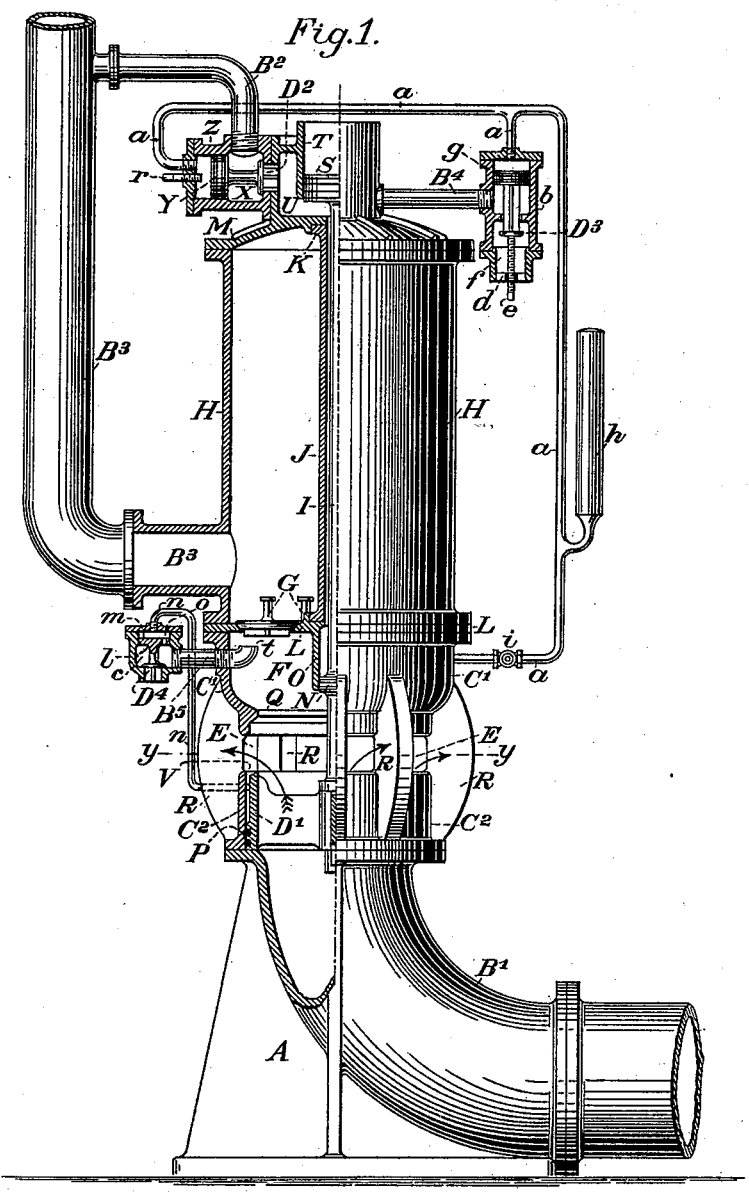

(No Model.)

W. R. PHILLIPS.
WATER IMPELLING MACHINE.

No. 595,919.   Patented Dec. 21, 1897.

Witnesses   Inventor:

UNITED STATES PATENT OFFICE.

WILLIAM R. PHILLIPS, OF SEATTLE, WASHINGTON.

WATER-IMPELLING MACHINE.

SPECIFICATION forming part of Letters Patent No. 595,919, dated December 21, 1897.

Application filed February 26, 1897. Serial No. 625,164. (No model.)

*To all whom it may concern:*

Be it known that I, WILLIAM R. PHILLIPS, a citizen of the United States, residing in Seattle, in the county of King and State of Washington, have invented certain new and useful Improvements in Water-Impelling Machines of the class called "hydraulic rams;" and I hereby declare the following specification and drawings therewith to be a complete description of my improvements, also the manner of constructing and applying the same.

My invention relates to apparatus for raising or forcing water by the impulse of a flowing head after the manner of a hydraulic ram, but by a different method of controlling the interrupting-valve.

My invention consists of a main interrupting-valve controlled by a hydraulic piston and placed in connection with a supply-pipe, a wasteway, and an air or discharge vessel, so the impulse of the interrupted flow will be utilized in impelling and raising such portion of the water as the relative heads may determine. It also consists in a system of valves for distributing water to the hydraulic piston for operating the main valve; also, to permit the escape of air from a collecting-chamber below the air vessel, and in various attendant devices that will be more fully explained in the drawings herewith, in which—

Figure 2:
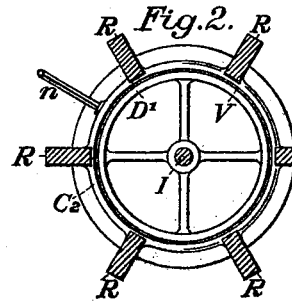

Figure 1 is an elevation, partially in section, of a water raising and impelling apparatus made according to my invention. Fig. 2 is a cross-section on the line $y\ y$ of Fig. 1.

Similar letters of reference on the two figures indicate corresponding parts.

The apparatus is mounted on a strong pedestal A, formed integrally with the supply-pipe B'. On the top of this pedestal and supply-pipe are chambers C' C², joined by the ribs R. The bottom section C² forms a cylinder in which slides the main valve D' for covering and uncovering the escape-way E. The top section C' contains a chamber from which a series of valves G open into the air-chamber or discharge vessel H.

The main valve D' is attached to a stem I, that passes through a close sleeve J, the latter fitting at K into the covering-plate M of the air vessel H, and into the valve-plate L at the bottom, as shown in Fig. 1. The valve-stem I is provided with a piston N, sliding in a sleeve extension O of the valve-plate L, so as to prevent water or air from escaping from the chamber F into the sleeve J.

The main valve D' (shown in its open position in Fig. 1) is provided with packing-rings P, and, when raised, covers and closes the escape-way E, resting against the beveled seat Q, shutting off the escape or waste flow through the issues E and from the main pipe B'.

On the upper end of the stem I is a piston S, moving in a short cylinder T and exposed at the bottom to water passing through the port or duct U from the valve D² and the chamber X.

The chamber X is in communication, by means of the pipe B², with the discharge-pipe B³ or some other source of static pressure. As arranged in Fig. 1, this chamber X is under pressure due to the head resting on the pipe B³ and in the chamber H. Formed integrally with the valve D² is a piston Y moving in a short cylinder Z, the latter communicating with the chamber C' by means of the small pipe $a$. Communicating also with the passage U and the bottom of the piston S is a discharge-pipe B⁴, connecting to a chamber $b$, and with the valve D³, the latter opening downward into the chamber $f$ and to a wasteway at $d$.

Attached to or formed integrally with the valve D³ is a piston $g$, moving in a short cylinder $b$, the outer or upper end of which is in connection with the pipe $a$, as seen in Fig. 1. This valve D³, its piston and chamber, may with advantage be inverted for low pressures, so the valve will open by its weight when required.

Connected with the pipe $a$ is an air vessel $h$ to prevent water-ram and secure easier action on the pistons Y and $g$ and valves D² and D³.

Connected with the chamber C' is a pipe B⁵ and an air-escape valve D⁴. (Shown in its closed position in Fig. 1.) This valve D⁴ is also provided with a piston $l$, moving in the short cylinder $m$. The cylinder $m$ is by means of the pipe $n$ in communication with the annular space V around the main valve D' and is in effect open until the piston D' rises, when the packing-rings P cover and close the outlet end of this pipe $n$.

Through the piston $l$ is a small hole or port $o$, that permits the escape of water from the pipe $B^5$ and chamber $c$ to the upper side of the piston $l$, putting the latter into equilibrium and permitting the valve $D^4$ to close when the main valve $D'$ rises and the pipe $n$ is closed at its discharge end, as before explained.

A cock $i$ is provided to close the pipe $a$, and set-screws $r$ and $e$ are arranged to regulate the range of the valves $D^2$ and $D^3$.

Having now described the various elements of my improved water-impelling apparatus and the manner of its construction, I will next proceed to explain the method of its operation.

Supposing the main valve $D'$ to be at the bottom, as seen in Fig. 1, and the pipe $a$ sustaining no pressure, and that the chamber X is filled under pressure from the pipe $B^2$, the valve $D^2$ will then open by reason of the larger area of the piston Y, and this same pressure flowing through the pipe $B^4$ will enter the chamber $b$, closing the valve $D^3$ because of the larger area of the piston $g$. Then the piston S will be subjected to the full force of the pressure in the pipe $B^3$ and the chamber H or other source from which this pressure may be drawn. This piston S then raises the stem I and the main valve $D'$, shutting off the escape of water at E and directing the momentum or force of the flowing water in the supply-pipe $B'$ into the chamber $C'$. As the main valve $D'$ is closing toward its seat Q and as the water is rising in the chamber $C'$, the air therein escapes freely through the pipe $B^5$ and the valve $D^4$, offering no resistance until the water rises above and enters the pipe $B^5$ at $t$. At the same time the discharge end of the pipe $n$ is closed by the piston-rings P, and the water in the chamber $c$ above the valve D then escapes through the small hole or port $o$ to the top of the piston $l$, putting that in equilibrium and permitting the valve $D^4$ to close. The chamber $C'$ being thus closed receives the full impinging force of the water flowing through the supply-pipe $B'$. The pressure therein rising and exceeding that in the air vessel or discharge-chamber H the water is forced through the valves G into the chamber H and out at the discharge-pipe $B^3$. The pressure in the chamber $C'$ is communicated to the pipe $a$, and by the time a maximum is reached and the working stroke completed the water from this pipe $a$, acting on the outer sides and whole area of the pistons Y and $g$, closes the valve $D^2$ and opens the one $D^3$, permitting the water to escape from beneath the piston S, relieving that of pressure. The main valve $D'$, stem I, and piston S then descend by gravity, ready to begin another stroke, this cycle of operations continuing in regular sequence, discharging at each stroke a quantity of water into the air vessel H and out through the pipe $B^3$ to the height and place to be supplied.

It may be explained that by enlarging the chamber $C'$ so the water will not rise to the plate L and omitting the pipe $B^5$ and air-escape valve $D^4$ the same apparatus can be employed for compressing air without other change of its several parts, unless in size of ducts to accommodate the more rapid flow of air.

Having thus described the method of constructing and the manner of operating my improved water-impelling apparatus, what I claim as new, and desire to secure by Letters Patent, is—

1. In a water-impelling engine or ram, an interrupting main valve, a collecting-chamber above the same, a hydraulic cylinder and piston in alinement with said main valve, a piston-rod connecting said piston and said main valve, a main discharge-pipe, a pipe connection between the main discharge-pipe and the said hydraulic cylinder, a distributing-valve between the said pipe connection and the said hydraulic cylinder, a distributing-valve and wasteway on the other side of the said cylinder, connected therewith, and a pipe connection between the collecting-chamber and the said distributing-valves, substantially as specified.

2. In a water-impelling engine or ram, an interrupting main valve, a hydraulic piston connected therewith, located in a hydraulic cylinder, a main discharge-pipe, distributing valves and pistons on either side of the said hydraulic cylinder, in communication with the same, a collecting-chamber, a pipe connection between the main discharge-pipe and the negative side of the distributing-valve pistons, and a pipe connection between the collecting-chamber and the positive side of the distributing-valve pistons, substantially as specified.

3. In a water-impelling engine or ram, an interrupting main valve operated by a hydraulic piston on the stem thereof; an inlet distributing-valve, and a piston of large area connected thereto, so the valve will open when exposed to static pressure between the valve and piston, in the manner substantially and for the purposes described.

4. In a water-impelling engine or ram, an interrupting main valve operated by a hydraulic piston connected thereto; an inlet distributing-valve admitting water to the piston, opened by static pressure in the manner described; an outlet-valve communicating with the same piston and closed by the same pressure, so as to cause an upward or closing stroke of the interrupting-valve, in the manner substantially as described.

5. In a water-impelling engine or ram, an interrupting main valve controlled by a hydraulic piston; distributing inlet and outlet valves for the latter; actuating-pistons connected to the valves, moved in one direction by a static water pressure in the manner described, and in the other direction by counter-pressure from the impinging force of the driving-current, in the manner substantially as described.

6. In a water-impelling engine or ram, an interrupting main valve raised and controlled by a hydraulic piston; distributing inlet and outlet valves for the hydraulic piston, connected to or formed integrally with pistons and of larger area than the valves to which they are attached, operating in one direction by pressure applied between the valves and their pistons, and in the other direction by counter-pressure applied over the whole area of the pistons, in the manner substantially and for the purposes specified.

7. In a water-impelling engine or ram, an interrupting main valve raised or controlled by a hydraulic piston; distributing water-valves to operate the piston, supplementary hydraulic pistons to actuate the distributing-valves by difference of area on the two sides of the pistons and independent water connections thereto, in the manner substantially and for the purposes described.

8. In a water-impelling engine or ram, an interrupting main valve and chamber, a superimposed collecting-chamber, a hydraulic cylinder $m$ piston $l$, and air-escape valve $D^4$, an air-escape pipe between said collecting-chamber and said hydraulic cylinder, and a pipe connection between the main-valve chamber and the said hydraulic air-escape cylinder, substantially as specified.

9. In a water-impelling engine or ram, an interrupting main valve and chamber, having a lateral discharge-way, a superimposed collecting-chamber, a hydraulic cylinder with air-escape valve therein, an air-escape pipe between said collecting-chamber and said hydraulic cylinder, a pipe connection between the main-valve chamber and the said hydraulic air-escape cylinder, and a piston in said hydraulic cylinder connected to the valve therein, having a leakway through the said piston whereby equilibrium is established when the discharge-way is closed, permitting the closure of the said air-escape valve, substantially as specified.

10. In a water-impelling engine or ram, a main supply-pipe, air vessel and interrupting-valve, as herein described; a collecting-chamber above the main valve, and an air-valve therefor, the latter and its actuating-piston connected with the collecting-chamber to permit the escape of air, and the piston connected with the main discharge-way by a pipe in such manner that the pipe will be closed by the interrupting main valve when the latter rises and closes the main discharge, in the manner substantially as described.

In testimony whereof I have hereunto affixed my signature in the presence of two witnesses.

WILLIAM R. PHILLIPS.

Witnesses:
H. SANDERSON,
WILSON D. BENT, Jr.